May 27, 1941.   O. L. McINTYRE   2,243,433
PIPE HOLDER
Filed Jan. 24, 1940
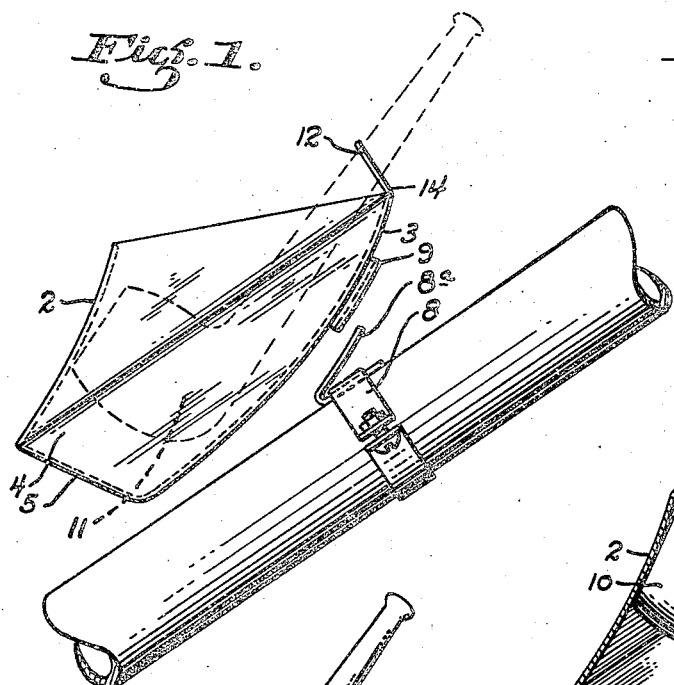
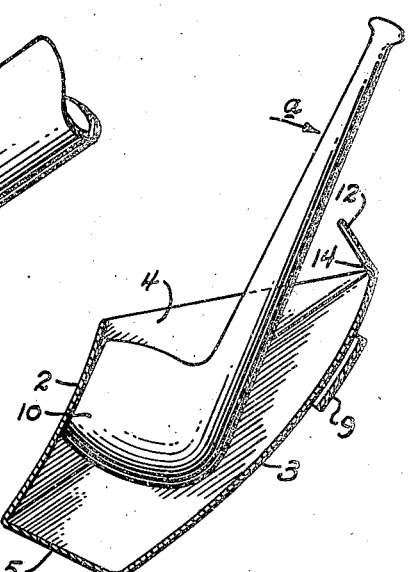
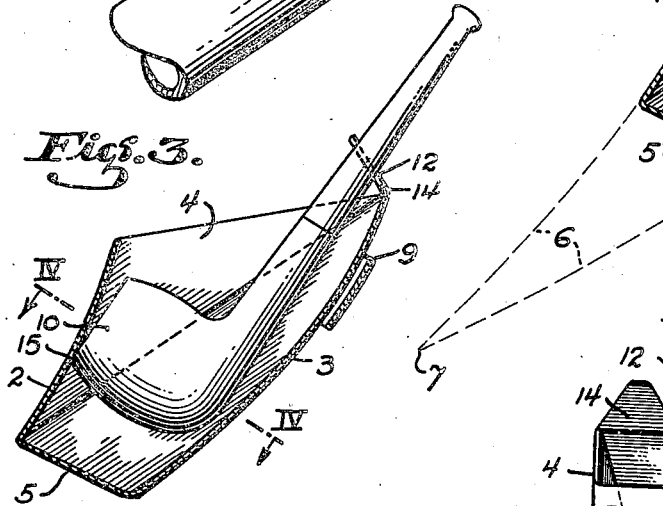
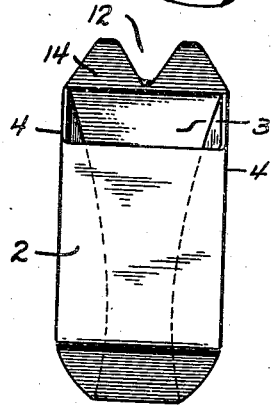
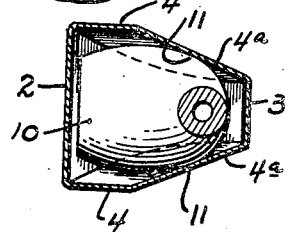
INVENTOR.
Otis L. McIntyre.
BY
Chas. E. Townsend
ATTORNEYS.

Patented May 27, 1941

2,243,433

UNITED STATES PATENT OFFICE 2,243,433

PIPE HOLDER

Otis L. McIntyre, San Carlos, Calif.

Application January 24, 1940, Serial No. 315,361

4 Claims. (Cl. 131—241)

This invention relates to a pipe holder.

The object of the present invention is to improve and simplify generally the construction and operation of pipe holders; to provide a pipe holder which is particularly intended for use in an automobile or like vehicle and which may be placed within convenient reach of the driver, as on the steering post; to provide a pipe holder which holds the pipe by wedge action and grips it securely against rattle and displacement; to provide a pipe holder which is adapted to receive and secure pipes of varying size and shape; and further, to provide a holder of the character described which completely encloses the bowl of the pipe and thereby prevents spilling of hot ashes, and thus eliminates danger of fire.

The pipe holder is shown by way of illustration in the accompanying drawing, in which—

Fig. 1 is the side elevation showing the pipe holder in position to be secured to the steering post of an automobile;

Fig. 2 is a central vertical section of the pipe holder showing the first position assumed by a pipe when inserting the same;

Fig. 3 is a similar section showing the pipe when fully inserted;

Fig. 4 is a horizontal cross section taken on line IV—IV of Fig. 3; and

Fig. 5 is a front view of the pipe holder.

The pipe holder consists of a front section 2, a back section 3, a pair of side sections 4—4, and a bottom section 5. The front and back sections present arched or curved surfaces struck from different points of radii, so that if the lines were continued as indicated by dotted lines at 6 (see Fig. 2), they would intersect each other at the point 7. This is important, as the gradually converging curved surfaces thus produced permit a pipe to be wedged between them, as will hereinafter be described.

By referring to Fig. 4, it will be noted that the opposite sides of the holder are parallel, as indicated at 4—4, but that the major portion of each side is bent on an angle, as indicated at 4a—4a, so as to converge toward the back and bottom sections. This also is important, as it provides additional faces between which the pipe may be wedged.

Any suitable support or securing means for the pipe holder may be employed. As here shown, a clamping band 8 and a hook shaped clip 8a may be secured to the steering column of an automobile within convenient reach of the driver. The back of the holder is provided with a socket 9 which is slipped over the clip. This in turn is bendable, and the holder may thus assume any convenient angle or position desired.

In actual practice the pipe is inserted through the upper open end of the holder with the face 10 of the pipe head or bowl substantially parallel to the front curved surface 2, as shown in Fig. 2, and pushed downwardly until the sides or lower part of the bowl engage the converging sides of the holder at the points indicated at 11—11 (see Fig. 4). The pipe, held by the stem, is then swung rearwardly in the direction of arrow $a$ about the points 11—11, while a downward pressure is exerted, and when the movement is completed, the stem will rest in a notch 12 formed in the flange 14 forming part of the holder.

During rearward swinging movement, the edge of the pipe shown at 15 engages the front section 2, and as this assumes a curved rearwardly inclined surface, the pipe head or bowl becomes jammed or wedged between three faces, or the points indicated at 11—11 and 15, and it becomes so securely gripped that rattle or accidental displacement is prevented; yet the pipe is readily removed when required by merely swinging the stem forward and lifting it out of the holder. Thus a convenient place is provided for the pipe and fire hazard is reduced to a minimum, as any hot ashes which may drop out of the pipe will fall into the bottom of the holder.

The holder may be made of metal or any other suitable material; it will receive and retain pipes of varying shapes and sizes; and while the holder shown is capable of receiving only one pipe, it is obvious that two or more holders may be secured side by side if a receptacle for more than one pipe is desired.

While this and other features of the invention have been more or less specifically described and illustrated, it is to be understood that various changes may be resorted to, all within the scope of the appended claims.

Having thus described my invention, what I claim and desire to secure by Letters Patent is:

1. A pipe holder and ash receptacle comprising a front, a back, a bottom, and a pair of side sections, all of said sections being united to form a receptacle which is closed except that it is open at the upper end to permit insertion of a pipe, said front section presenting a surface inclined with relation to the back section, and the sides presenting angular surfaces converging toward the back section and bottom, which, together with the inclined front, form three surfaces between which the bowl of a pipe is adapted to be wedged.

2. A pipe holder and ash receptacle comprising a front, a back, a bottom, and a pair of side sections, all of said sections being united to form a receptacle which is closed except that it is open at the upper end to permit insertion of a pipe, said front section presenting a surface inclined with relation to the back section, and the sides presenting angular surfaces converging toward the back section and bottom, which, together with the inclined front, form three surfaces between which the bowl of a pipe is adapted to be wedged, and a notched flange formed at the top of the back section to receive the stem of the pipe.

3. A pipe holder and ash receptacle comprising a front, a back, a bottom, and a pair of side sections, all of said sections being united to form a receptacle which is closed except that it is open at the upper end to permit insertion of a pipe, said front section presenting a curved surface inclined with relation to the back section, and the sides presenting angular surfaces converging toward the back section and bottom, which, together with the inclined front, form three surfaces between which the bowl of a pipe is adapted to be wedged.

4. A pipe holder and ash receptacle comprising a front, a back, a bottom and a pair of side sections, all of said sections being united to form a receptacle which is closed except that it is open at one end to permit insertion of a pipe, said front, back and side sections converging toward each other to present surfaces which are closer together adjacent the bottom than at the open end, so that when the bowl of a pipe is inserted it may be wedged between said surfaces.

OTIS L. McINTYRE.